United States Patent
Lu et al.

(10) Patent No.: US 11,505,927 B2
(45) Date of Patent: Nov. 22, 2022

(54) PULL-OUT FAUCET MAIN BODY INCLUDING VALVE CORE SEAT ASSEMBLY AND PULL-OUT FAUCET

(71) Applicant: PPI XIAMEN INDUSTRY CO., LTD., Xiamen (CN)

(72) Inventors: Wenrong Lu, Xiamen (CN); Jijun Lin, Xiamen (CN)

(73) Assignee: PPI XIAMEN INDUSTRY CO., LTD., Xiamen (CN)

( * ) Notice: Subject to any disclaimer, the term of this patent is extended or adjusted under 35 U.S.C. 154(b) by 205 days.

(21) Appl. No.: 17/019,391

(22) Filed: Sep. 14, 2020

(65) Prior Publication Data

US 2021/0079633 A1 Mar. 18, 2021

(30) Foreign Application Priority Data

Sep. 12, 2019 (CN) .......................... 201910864505.5

(51) Int. Cl.
| | | |
|---|---|---|
| *E03C 1/04* | (2006.01) | |
| *F16K 27/00* | (2006.01) | |
| *F16K 31/60* | (2006.01) | |

(52) U.S. Cl.
CPC .......... *E03C 1/0403* (2013.01); *E03C 1/0404* (2013.01); *F16K 27/00* (2013.01); *F16K 31/60* (2013.01); *E03C 2001/0415* (2013.01)

(58) Field of Classification Search
CPC .................. E03C 1/0403; E03C 1/0404; E03C 2001/0412; F16K 27/00; F16K 31/60
See application file for complete search history.

(56) References Cited

U.S. PATENT DOCUMENTS

| | | | | |
|---|---|---|---|---|
| 7,533,683 B2* | 5/2009 | Ortega | .................. | F16K 19/006 137/454.6 |
| 2004/0010848 A1* | 1/2004 | Esche | ....................... | E03C 1/04 4/675 |
| 2008/0276367 A1* | 11/2008 | Bares | .................... | F16K 19/006 4/677 |
| 2012/0018020 A1* | 1/2012 | Moore | .................. | E03C 1/0403 137/801 |
| 2013/0186496 A1* | 7/2013 | Hsu | .......................... | E03C 1/04 137/801 |
| 2014/0075667 A1* | 3/2014 | Li | ......................... | E03C 1/0402 4/677 |
| 2016/0244952 A1* | 8/2016 | Stoelzel | .................. | E03C 1/021 |

* cited by examiner

*Primary Examiner* — Patrick C Williams
(74) *Attorney, Agent, or Firm* — Bayramoglu Law Offices LLC (57) ABSTRACT

A pull-out faucet main body including a valve core seat assembly and a pull-out faucet are provided. The faucet main body is composed of a main pipe and a side wall branch pipe. The valve core seat assembly includes a valve core seat and a main body fixing seat. The main body fixing seat has a body that matches an included angle between the main pipe and the side wall branch pipe. A lug is additionally provided horizontally outward on an outer side of the body, and at least one water inlet channel and a water outlet channel which are independent from each other are provided in an inner cavity of the body, and the main body fixing seat is locked and fixed inside the main pipe by a nut, and the valve core seat is exactly engaged into the side wall branch pipe.

10 Claims, 7 Drawing Sheets

PULL-OUT FAUCET MAIN BODY INCLUDING VALVE CORE SEAT ASSEMBLY AND PULL-OUT FAUCET

This application claims the benefit of Chinese Patent Application No. CN201910864505.5, titled "PULL-OUT FAUCET MAIN BODY INCLUDING VALVE CORE SEAT ASSEMBLY AND PULL-OUT FAUCET", filed on Sep. 12, 2019 with the Chinese Patent Office, the disclosure of which is hereby incorporated by reference herein in its entirety.

FIELD

The present application relates to the field of sanitary wares, in particular to a pull-out faucet (including pull-out and pull-down and any other pull type faucet herein) main body including a valve core seat assembly and a pull-out faucet made with the faucet main body.

BACKGROUND

In order to facilitate the kitchen cleaning, pull-out faucets have been widely used in daily life of households of various types and countries, and a pull-out water outlet head carrying a hose at its back of the pull-out faucet can be pulled out and returned in a certain range, which provides convenience for consumers in using them;

Due to the use requirements of the pull-out faucet, it is generally necessary to arrange a valve core in a side wall branch pipe of the pull-out faucet, and arrange water tubes in its main body, so it is often necessary to assemble a valve core seat at a corner portion between the main body and the side wall branch pipe, for fixing the valve core and connecting the water tubes, since the corner portion is not reliable to receive force, it is difficult to effectively fix the valve core seat in the corner portion.

According to the conventional practice, in the design of this structure, generally, structures capable of snapping fit with each other are provided between the valve core seat and the side wall branch pipe to realize the fitting between the valve core seat and the side wall branch pipe. However, in the process of use, due to the long-term pulling of the pull-out water outlet head, a hose inside the side wall branch pipe is brought to slide, which may impose a pulling force on the valve core seat ever and again, however, and solely using the snapping fit between the valve core seat and the side wall branch pipe may lead to a limited load-bearing capability of the valve core seat, such that the valve core seat is apt to falling off from the connection with the side wall branch pipe; moreover, the fitting manner imposes a high requirement on precision of the fitting between the valve core seat and the side wall branch pipe, and if any error occurred in the manufacturing precision causes deviation of position of the valve core disposed therein, it may cause gap between the fitting faces of the valve core and the valve core seat and the water leakage from the gap, to achieve the precision of fitting between the valve core seat and the side wall branch pipe, it is required to improve the manufacturing precision of the inner structure of the side wall branch pipe, which may result in a high manufacturing cost. Therefore, it is necessary to provide a more reasonable fitting structure to address the above issue.

SUMMARY

A first aspect of the present application is to provide a pull-out faucet main body including a valve core seat assembly, with this structure, the valve core seat assembly can be firmly connected to the faucet main body without performing a high precision processing on the side wall branch pipe of the faucet main body, thereby reducing the manufacturing costs.

A second aspect of the present application is to provide a pull-out faucet made with the above faucet main body.

In order to achieve the first aspect of the present application, the solution of the present application is as follows.

A pull-out faucet main body including a valve core seat assembly is provided, the pull-out faucet main body includes a faucet main body and a valve core seat assembly. The faucet main body is composed of a main pipe and a side wall branch pipe, the main pipe is penetrated in an axial direction, and the side wall branch pipe is obliquely arranged from a side wall of the main pipe, and the side wall branch pipe is penetrated in an axial direction. The valve core seat assembly includes a valve core seat and a main body fixing seat. The main body fixing seat includes a body and a lug, and the body is composed of a vertical section and an oblique section, an included angle formed by the vertical section and the oblique section matches an included angle formed by the main pipe and the side wall branch pipe, the body is provided with at least one lug extending outwards in a horizontal direction, and the lug is provided with a first threaded hole, and one water outlet channel and at least one water inlet channel which are independent from each other are formed inside the body. The valve core seat includes a water passing end surface and an annular flange, and the water passing end surface is fixedly arranged on an end of the oblique section of the body of the main body fixing seat, the water passing end surface is provided with a water outlet and a water inlet which are in communication with the water outlet channel and the water inlet channel of the body respectively. An annular flange extends outwardly from the water passing end surface at an end facing towards the side wall branch pipe, and forms together with an outer edge of the water passing end surface 210 a first stepped surface, and the annular flange has an outer wall provided with a threaded section. An inner wall of the main pipe is provided with a second threaded hole, and when the valve core seat assembly is installed in the main pipe, and the first threaded hole of the lug of the main body fixing seat is aligned opposite to the second threaded hole, a bolt is threadedly connected into the first threaded hole and the second threaded hole sequentially, thereby locking and fixing the main body fixing seat into the main pipe, a keeping off space is formed between the body of the main body fixing seat and the inner wall of the main pipe, the valve core seat is exactly located in the side wall branch pipe, and a gap is presented between the threaded section of the annular flange of the valve core seat and an inner wall of the side wall branch pipe.

Further, the lug of the main body fixing seat is provided with a positioning through hole beside its first threaded hole; and the inner wall of the main pipe is provided with a positioning blind hole beside its second threaded hole, and the positioning blind hole is aligned opposite to the positioning through hole; and when the valve core seat assembly is mounted in the main pipe, a positioning pin passes through the positioning through hole into the positioning blind hole sequentially. When the first threaded hole of the lug of the main body fixing seat and the second threaded hole in the main pipe are locked and fixed to each other by a bolt, a cap nut of the bolt abuts by its inner side against an end of the positioning pin such that the positioning pin does not fall off from the positioning through hole.

Further, the positioning pin has an interference fit with each of the positioning through hole and the positioning blind hole.

According to the above solution, since the body of the main body fixing seat of the valve core seat assembly has an included angle matching an included angle between the main pipe and the side wall branch pipe, the first threaded hole of the body lug and the second threaded hole of the inner wall of the main pipe are sequentially locked and fixed by the bolt, such that the first threaded hole and the second threaded hole are both located in axial positions of the main pipe, which facilitates the locking and fixing by the bolt. Moreover, the positioning pin is further provided to the position where the main body fixing seat and the main pipe are connected to each other; thereby significantly enhancing the firmness of connection between the valve core seat assembly and the faucet main body.

In order to achieve the second aspect of the present application, a pull-out faucet is disclosed according to the present application, which includes the valve core seat fixing structure of the pull-out faucet as described above, and a water outlet channel, a first water inlet channel and a second water inlet channel which are independent from each other are formed in the body of the main body fixing seat. The water passing end surface of the valve core seat is provided with a first water outlet, a first water inlet and a second water inlet respectively, and the water outlet channel is in communication with the water outlet, the first water inlet channel is in communication with the first water inlet, and the second water inlet channel is in communication with the second water inlet.

A sleeve, a valve core, and a compression ring are further provided in the side wall branch pipe. The sleeve has an inner wall provided with a threaded section, and is arranged inside the side wall branch pipe and is threadedly connected to the threaded section of the annular flange of the valve core seat. The valve core is configured to perform the adjustment of the water temperature and the switching on/off of the water flows, the valve core is provided with a water outlet end surface at an end facing towards the valve core seat, and the water outlet end surface is provided with a third water inlet, a fourth water inlet and a second water outlet respectively, and the valve core is provided at the other end with an adjusting knob. The valve core is arranged inside the sleeve, and the third water inlet, the fourth water inlet and the second water outlet of the water outlet end surface of the valve core are respectively in communication with the first water inlet, the second water inlet and the first water outlet correspondingly arranged in the water passing end surface of the valve core seat, and the compression ring is sleeved on an end, at the adjusting knob, of the valve core, and the compression ring has an outer wall provided with a threaded section, and with the compression ring and the sleeve being threadedly connected and fixed to each other, it is ensured that the valve core is firmly confined in the sleeve. A handle is rotatably arranged on an outer side of the side wall branch pipe, and is fixedly connected to the adjusting knob of the valve core.

A bent pipe is provided at an upper end of the main pipe, and a pull-out water outlet head is provided at an outer end of the bent pipe, and a threaded mounting hole is provided in the inner cavity of the main pipe above the keeping off space therein. A guide tube, a first water inlet tube, a second water inlet tube and a mixed water outlet hose are arranged to be nested in the main pipe, and the guide tube passes through the keeping off space and is threadedly connected and fixed to the threaded mounting hole, and the guide tube has an inner cavity in communication with the bent pipe. The first water inlet tube, the second water inlet tube, and the mixed water outlet hose pass through the gap between an outer wall of the guide tube and the inner wall of the main pipe and are respectively in communication with the first water inlet channel, the second water inlet channel and the water outlet channel correspondingly arranged in the body of the main body fixing seat, and the other end of the mixed water outlet hose passes through the guide tube, the bent pipe sequentially and is in a sealed connection with the water outlet head.

Cold water flows through the first water inlet channel of the body of the main body fixing seat via the first water inlet tube, and flows from the first water inlet of the valve core seat into the third water inlet of the valve core.

Hot water flows through the second water inlet channel of the body of the main body fixing seat via the second water inlet tube, and flows from the second water inlet of the valve core seat into the fourth water inlet of the valve core.

The cold water and the hot water converge into the valve core to form a mixed water, and the mixed water flows into the first water outlet of the valve core seat via the second water outlet of the valve core and flows into the mixed water outlet hose via the water outlet channel of the body of the main body fixing seat, and is finally sprayed out from the water outlet head.

In the pull-out faucet made with the above structure, the valve core seat is arranged in the side wall branch pipe, and a valve core cavity for installing the valve core is formed by the sleeve and the valve core seat, and the fitting between the sleeve and the valve core seat is not affected by the side wall branch pipe, thus the inner wall of the side wall branch pipe does not need to be processed with high precision, which therefore facilitates industrial manufacture. Moreover, the mixed water outlet hose is guided and limited by the guide tube, and the water outlet channel and the water inlet channel of the body of the main body fixing seat are utilized to physically separate the mixed water outlet hose from the multi water inlet tubes, such that the mixed water outlet hose is not susceptible to interfere with the water inlet tubes during the pulling, and thus, the user experience of the product is improved.

DETAILED DESCRIPTION OF EMBODIMENTS

The present application is described in detail hereinafter with reference to the drawings and embodiments.

Figure 1:
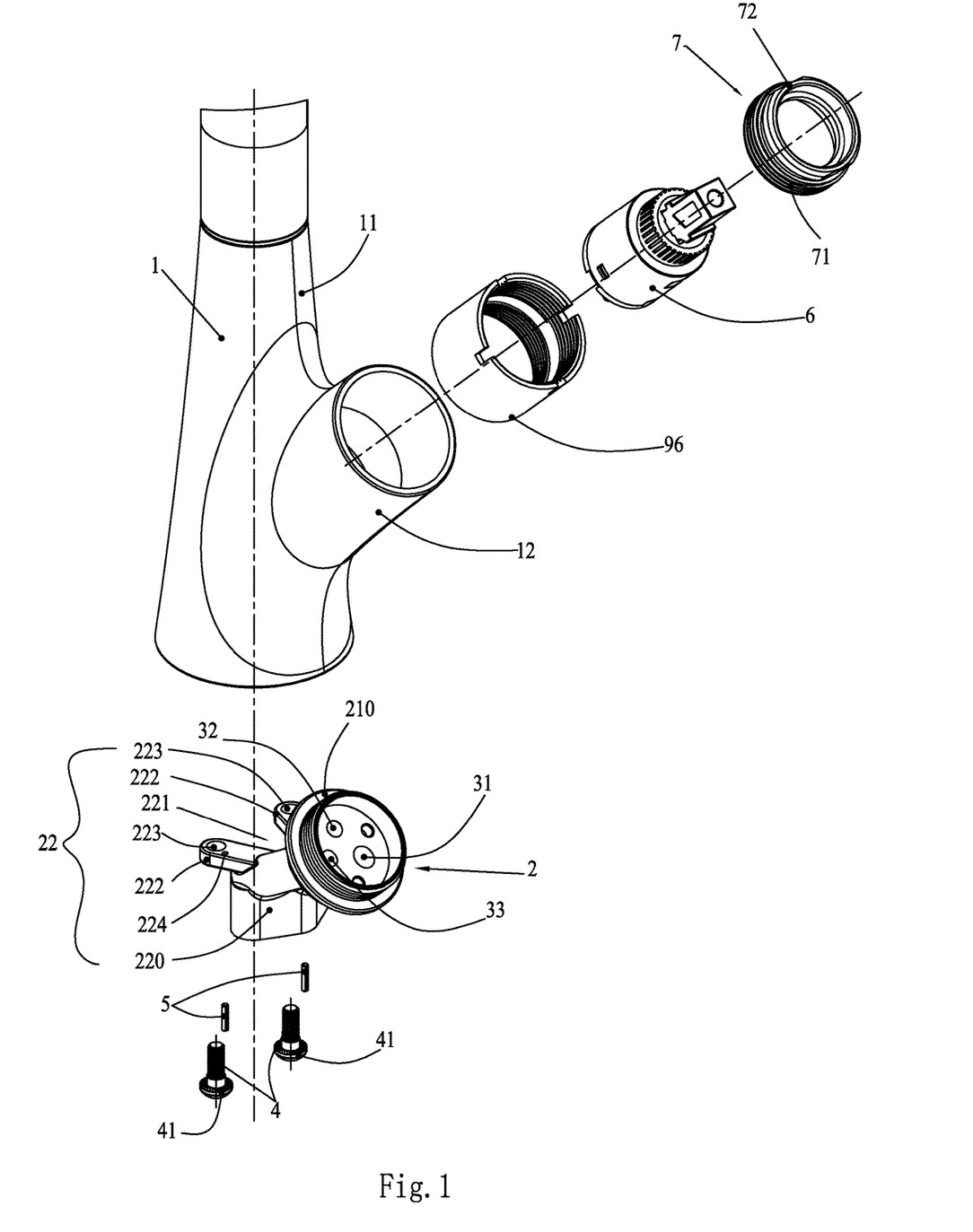
FIG. 1 is a schematic exploded view of the faucet main body containing the valve core seat assembly according to the present application.
Figure 2:
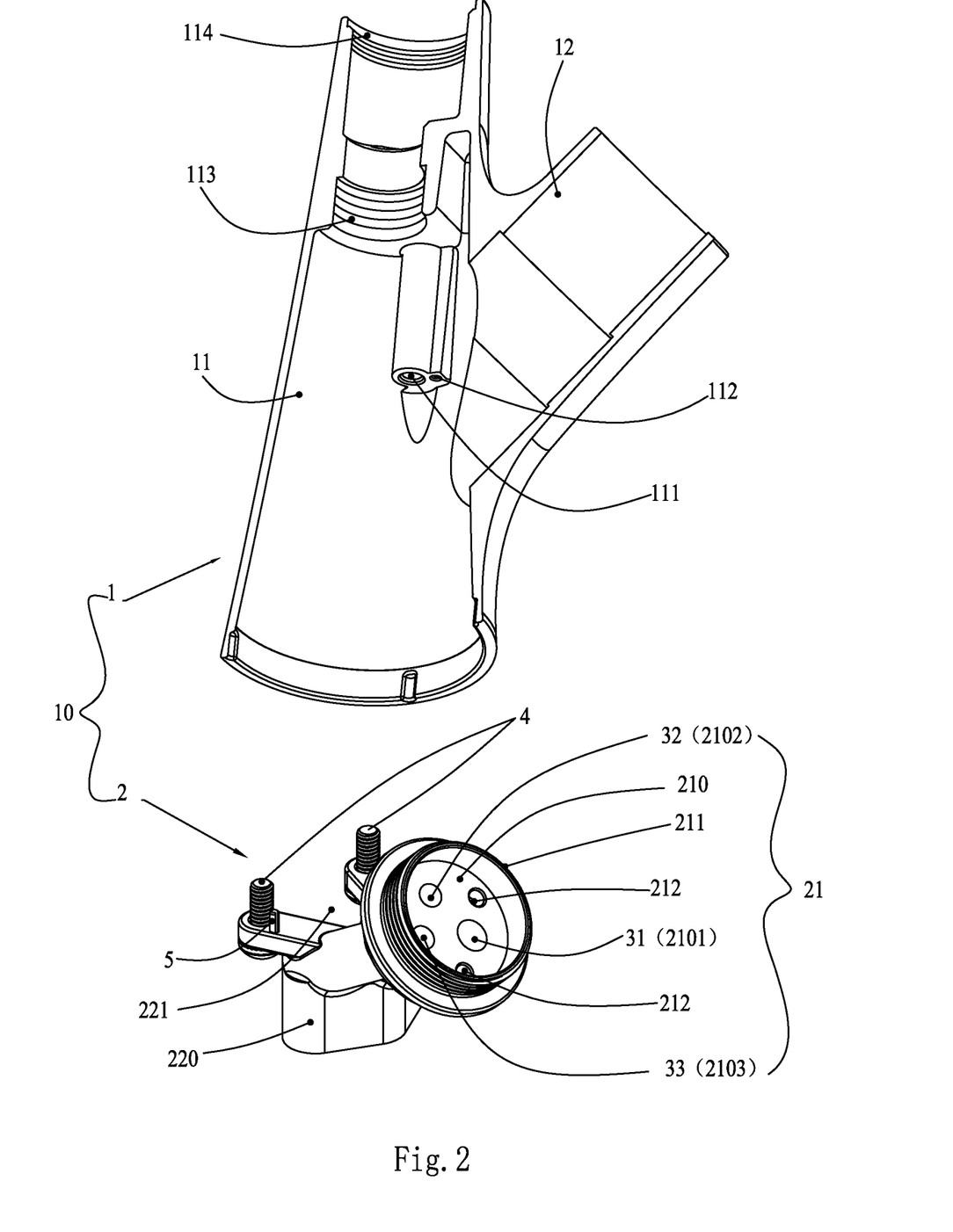
FIG. 2 is a schematic perspective sectional view of the faucet main body and a perspective view of the valve core seat assembly according to the present application.
Figure 3:
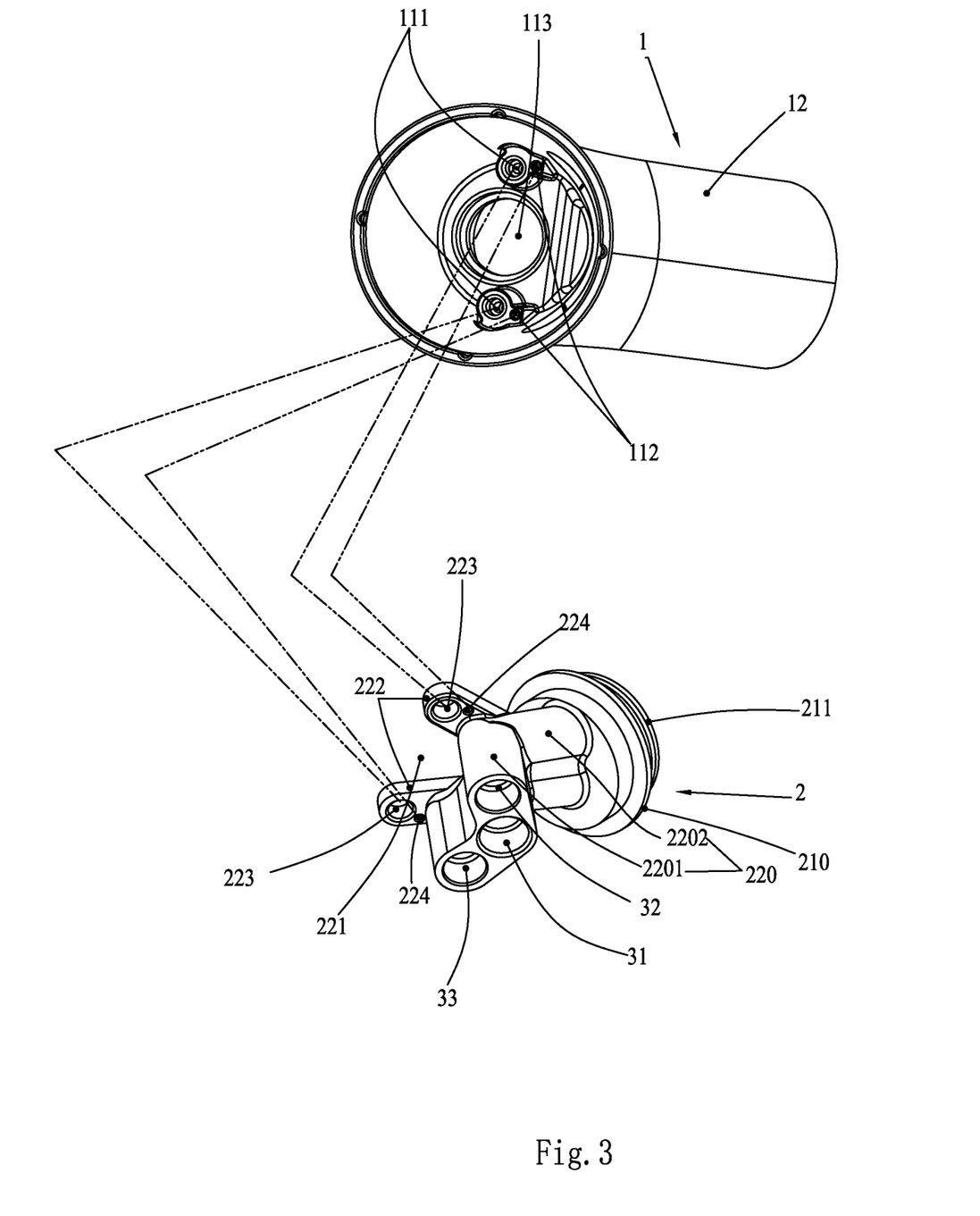
FIG. 3 is a schematic view showing the installation of the valve core seat assembly to the main pipe of the faucet main body according to the present application.

As shown in FIGS. 1 to 3, a pull-out faucet main body 10 including a valve core seat assembly, includes a faucet main body 1 and a valve core seat assembly 2. The faucet main body 1 is composed of a main pipe 11 and a side wall branch pipe 12. The main pipe 11 is penetrated in an axial direction, and the side wall branch pipe 12 is obliquely arranged from a side wall of the main pipe 11, and the side wall branch pipe 12 is also penetrated in an axial direction, and the side wall branch pipe 12 is provided with a second stepped surface 121 at an end facing towards the main pipe 11. The valve core seat assembly 2 includes a valve core seat 21 and a main body fixing seat 22. The main body fixing seat 22 includes a body 220 and a lug 222, the body 220 is composed of a vertical section 2201 and an oblique section 2202, and the valve core seat 21 is fixedly arranged at an end of the oblique section 2202. It is to be noted that, an included angle formed by the vertical section 2201 and the oblique section 2202 of the body 220 of the main body fixing seat 22 matches an included angle formed by the main pipe 11 and the side wall branch pipe 12, the definition of the matching of the included angles is not limited to mean that the two included angles are exactly the same, but means that when the main body fixing seat 22 and the main pipe 11 are fixedly connected to each other, the valve core seat 21 can be exactly disposed inside an inner cavity of the side wall branch pipe 12.

The body 220 of the main body fixing seat 22 has a contour that fits against an inner wall of the main pipe 11, and a water outlet channel 31, a first water inlet channel 32, and a second water inlet channel 33 which are independent from each other are formed in an inner cavity of the body 220 of the main body fixing seat 22. Moreover, a pair of lugs 222 with a gradually increasing distance therebetween are provided horizontally outwards on the body 220. Each of the two lugs 222 is provided with a first threaded hole 223. The inner wall of the main pipe 11 is provided with two second threaded holes 111. The two second threaded holes 111 are respectively aligned opposite to the two first threaded holes 223 of the main body fixing seat 22. Since the second threaded holes 111 and the first threaded holes 223 are all arranged along the axial position of the main pipe 11, when the valve core seat assembly 2 is installed into the main pipe 11, it is convenient for the two bolts 4 to be threadedly connected into the correspondingly arranged first threaded holes 223 and second threaded holes 111 sequentially from bottom to top of the main pipe 11, thereby locking and fixing the main body fixing seat 22 into the main pipe 11. Further, the two lugs 222, the inner wall of the main pipe 11 and an outer wall of the vertical section of the main body 220 enclose to form a keeping off space 221. In this case, the valve core seat 21 is exactly located in the side wall branch pipe 12.

The valve core seat 21 includes a water passing end surface 210 and an annular flange 211, and the water passing end surface 210 is fixedly arranged on an end of the oblique section 2202 of the body 220 of the main body fixing seat 22. The water passing end surface 210 is provided with a first water outlet 2101, a first water inlet 2102 and a second water inlet 2103 which are in communication with the water outlet channel 31, the first water inlet channel 32 and the second water inlet channel 33 of the body 220 respectively. An annular flange 211 extends outwardly from the water passing end surface 210 at an end facing towards the side wall branch pipe 12, and forms together with an outer edge of the water passing end surface 210 a first stepped surface, and the annular flange 211 has an outer wall provided with a threaded section. When the valve core seat 21 is disposed inside the side wall branch pipe 12, its water passing end surface 210 abuts exactly against the second stepped surface 121 of the side wall branch pipe 12, such that the valve core seat 21 may be stably arranged in the inner cavity of the side wall branch pipe 12, and a gap is presented between the threaded section of the annular flange 211 of the valve core seat 21 and an inner wall of the side wall branch pipe 12.

In a more preferable design, for further ensuring firmness of connection between the valve core assembly 2 and the faucet body 1, mainly for increasing firmness of connection between the main body fixing seat 22 and the inner wall of the main pipe 11, each of the lugs 222 of the main body fixing seat 22 is provided with a positioning through hole 224 beside its first threaded hole 223; and the inner wall of the main pipe 11 is provided with a positioning blind hole 112 beside each of the second threaded holes 111, and the positioning blind holes 112 are aligned opposite to the positioning through holes 224 respectively. When the valve core seat assembly 2 is mounted in the main pipe 11, a positioning pin 5 passes through the positioning through hole 224 into the positioning blind hole 112 sequentially, and the positioning pin 5 has an outer diameter greater than inner diameters of the positioning through hole 224 and the positioning blind hole 112, such that the positioning pin 5 has an interference fit with each of the positioning through hole 224 and the positioning blind hole 112. Moreover, a bolt 4 is threadedly connected into the first threaded hole 223 of the lug 222 of the main body fixing seat 22 and the second threaded hole 111 in the main pipe 11 sequentially, a cap nut 41 of the bolt 4 abuts by its inner side against an end of the positioning pin 5 such that the positioning pin 5 does not fall off from the positioning through hole 224.

Since the valve core seat 21 and the main body fixing seat 22 of the valve core seat assembly 2 are preferably integrally injection molded, in assembling, it is simply required to fixedly lock the integrated component in the main pipe 11, with its valve core seat 21 directly engaged into the side wall branch pipe 12, the installation is convenient, and the structural strength is high.

As shown in FIGS. 1, 4 to 7, a pull-out faucet is further disclosed according to the present application, which includes a pull-out faucet main body 10 including a valve core seat assembly. A sleeve 96, a valve core 6, a compression ring 7 and a decorative ring cover 97 are further provided in the side wall branch pipe 12. The sleeve 96 has an inner wall provided with a threaded section, and is arranged inside the side wall branch pipe 12 and is threadedly connected to the threaded section of the annular flange 211 of the valve core seat 21, to thereby forming a valve core cavity. The valve core 6 is arranged inside the sleeve 96 and is configured to perform the adjustment of the water temperature and the switching on/off of the water paths. The valve core is provided with a water outlet end surface at an end facing towards the valve core seat 21, and the water outlet end surface is provided with a third water inlet, a fourth water inlet and a second water outlet (not shown) respectively, and the valve core 6 is provided at the other end with an adjusting knob 61. For facilitating the connection and communication of the third water inlet, the fourth water inlet and the second water outlet of the water outlet end surface of the valve core 6 respectively with the first water inlet 2102, the second water inlet 2103 and the first water outlet 2101 correspondingly arranged in the water passing end surface of the valve core seat 21, the valve core 6 is provided with two positioning protruding bits (not shown) at the bottom thereof, and the water passing end surface 210 of the valve core seat 21 is provided with two positioning holes 212 aligned opposite to the two positioning protruding bits. The compression ring 7 is sleeved on an end, at the adjusting knob 61, of the valve core 6. The compression ring 7 is axially penetrated, and is composed of a large diameter end 71 and a small diameter end 72, and each of the large diameter end 71 and the small diameter end 72 is provided with external screw threads. With the large diameter end 71 of the compression ring 7 and the sleeve 96 being threadedly connected and fixed to each other, it is ensured that the valve core 6 is firmly confined within the sleeve 96. The decorative ring cover 97 is threadedly connected to the small diameter end 72 of the compression ring 7, to have a decorative effect. A handle 8 is disposed at an outer end of the decorative ring cover 97, and is fixedly locked to the adjusting knob 61 of the thermostatic valve core 6 by a screw 81, to thereby achieving the fixed connection between the handle 8 and the adjusting knob 61.

A bent pipe 9 is provided at an upper end of the main pipe 11, and a pull-out water outlet head 91 is provided at an outer end of the bent pipe 9. The bent pipe 9 is rotatable circumferentially about the central axis of the main pipe 11, and an inner wall of the upper end of the main pipe 11 is provided with a circle of stepped edge 114 and internal screw threads sequentially from top to bottom, and a threaded mounting hole 113 is provided in the inner cavity of the main pipe 11 above the keeping off space 221 therein. The pull-out faucet further includes a connector 13 and a C-shaped ferrule 14. The connector 13 is penetrated axially, and is provided at its bottom portion with external screw threads, a first annular groove 132 and a convex edge 131 sequentially from bottom to top, and a first O-ring 1331 is nested in the first annular groove 132. The connector 13 is provided with at least one second annular groove 133 at its upper part, and a second O-ring 1332 is nested in the second annular groove 133. The connector has a necking section arranged between the first annular groove 132 and the second annular groove 133, and the C-shaped ferrule 14 is sleeved on the necking section, and the C-shaped ferrule 14 is rotatable circumferentially relative to the connector 13. The bottom of the connector 13 and the internal screw threads of the upper end of the main pipe 11 are threadedly connected to each other until the convex edge 131 of the connector 13 and the stepped edge 114 of the inner wall of the upper end of the main pipe 11 abut against each other to ensure the firm connection of the connector 13 to the main pipe 11, and the bent pipe 9 is then sleeved onto the connector 13, the inner wall of the bent pipe 9 is in interference fit with the C-shaped ferrule 14 and, the second O-ring 1332 and the first O-ring 1331 at an upper end and a lower end of the connector 13 abut against and contact the inner wall of the bent pipe 9, thereby, the bent pipe 9 is circumferentially rotatable with respect to the connector 13.

Figure 4:
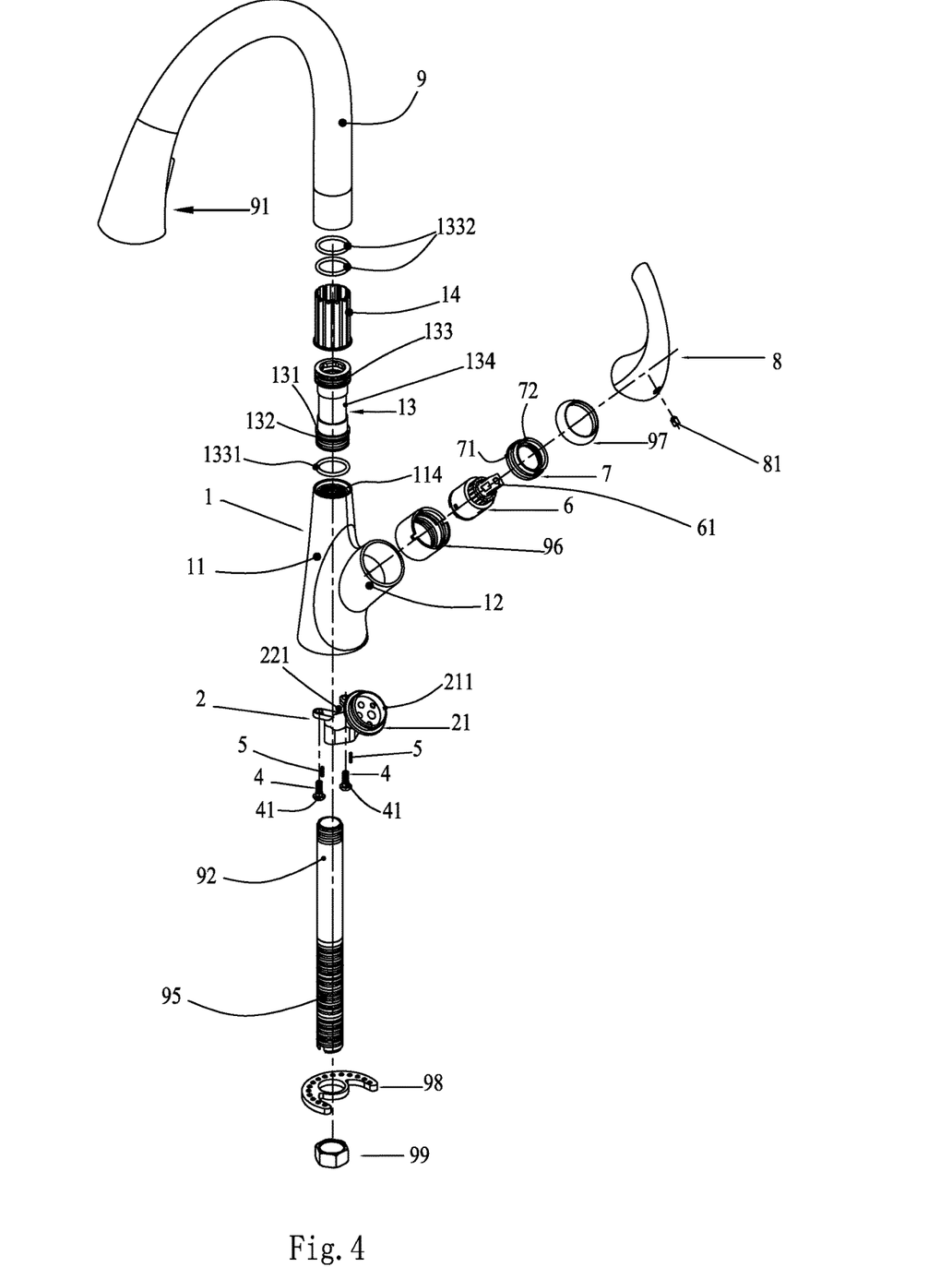
FIG. 4 is a schematic exploded view of the pull-out faucet according to the present application.
Figure 5:
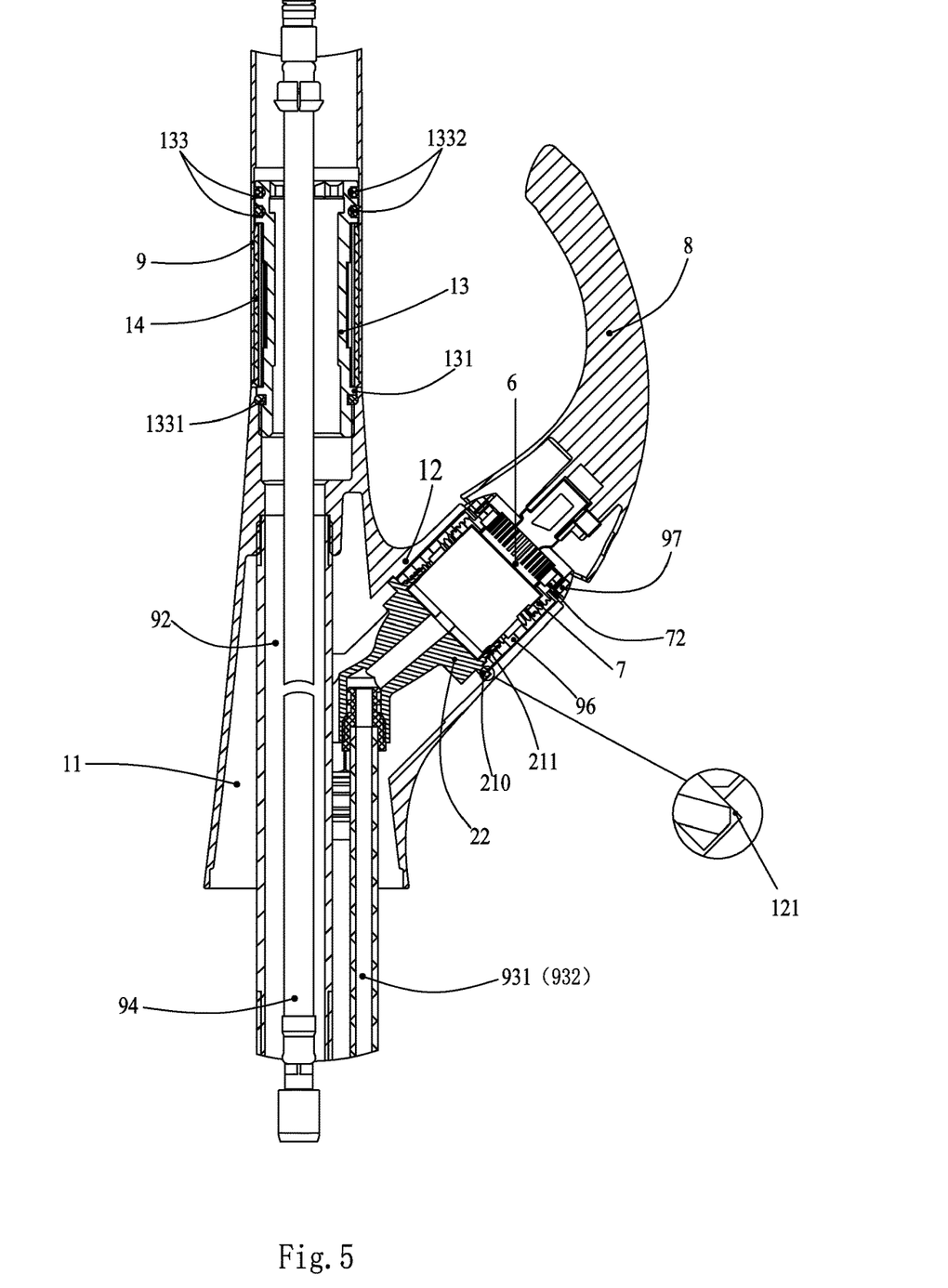
FIG. 5 is a schematic cross-sectional view of the pull-out faucet according to the present application.
Figure 6:
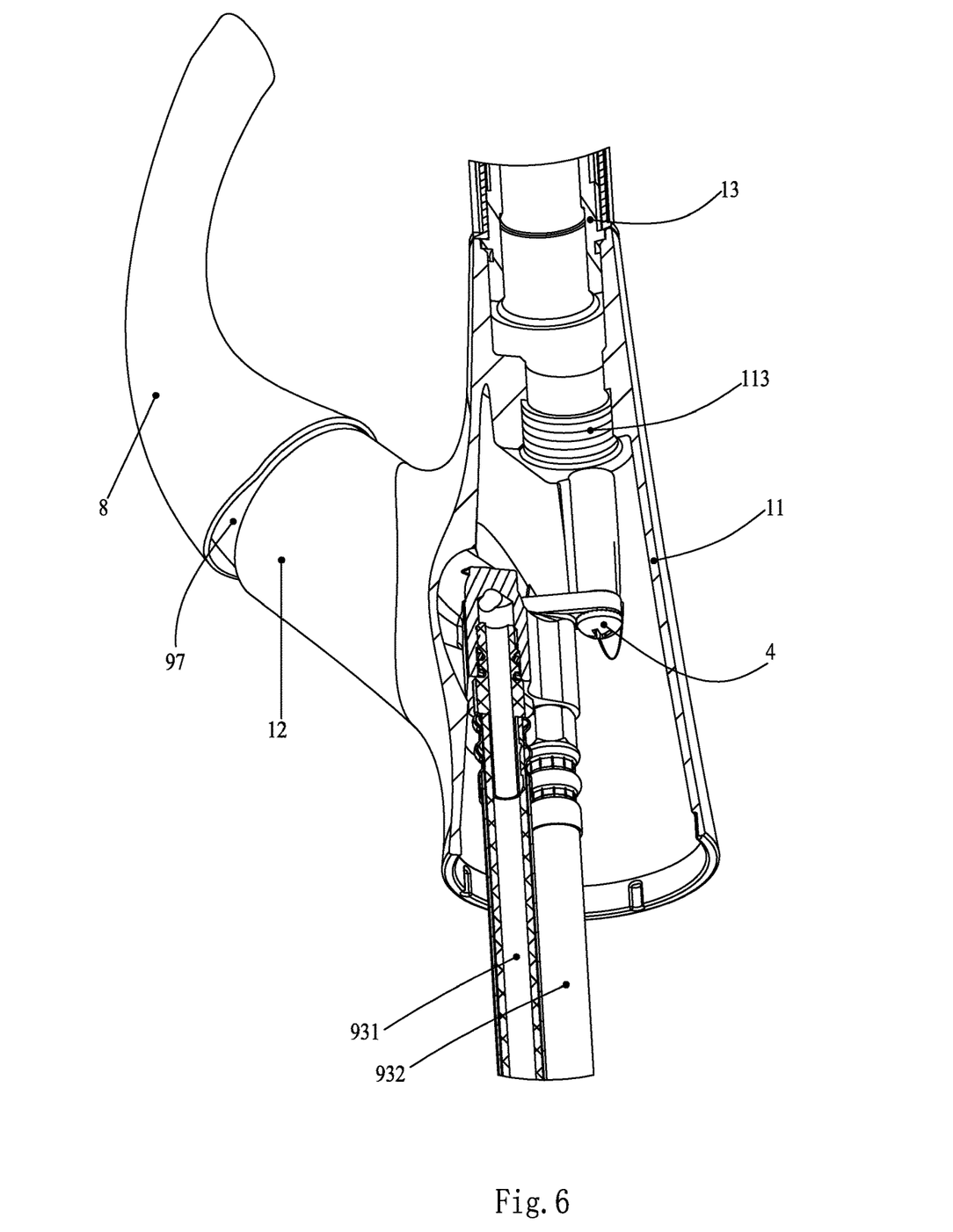
FIG. 6 is a schematic cross-sectional view from another angle of the pull-out faucet according to the present application.
Figure 7:
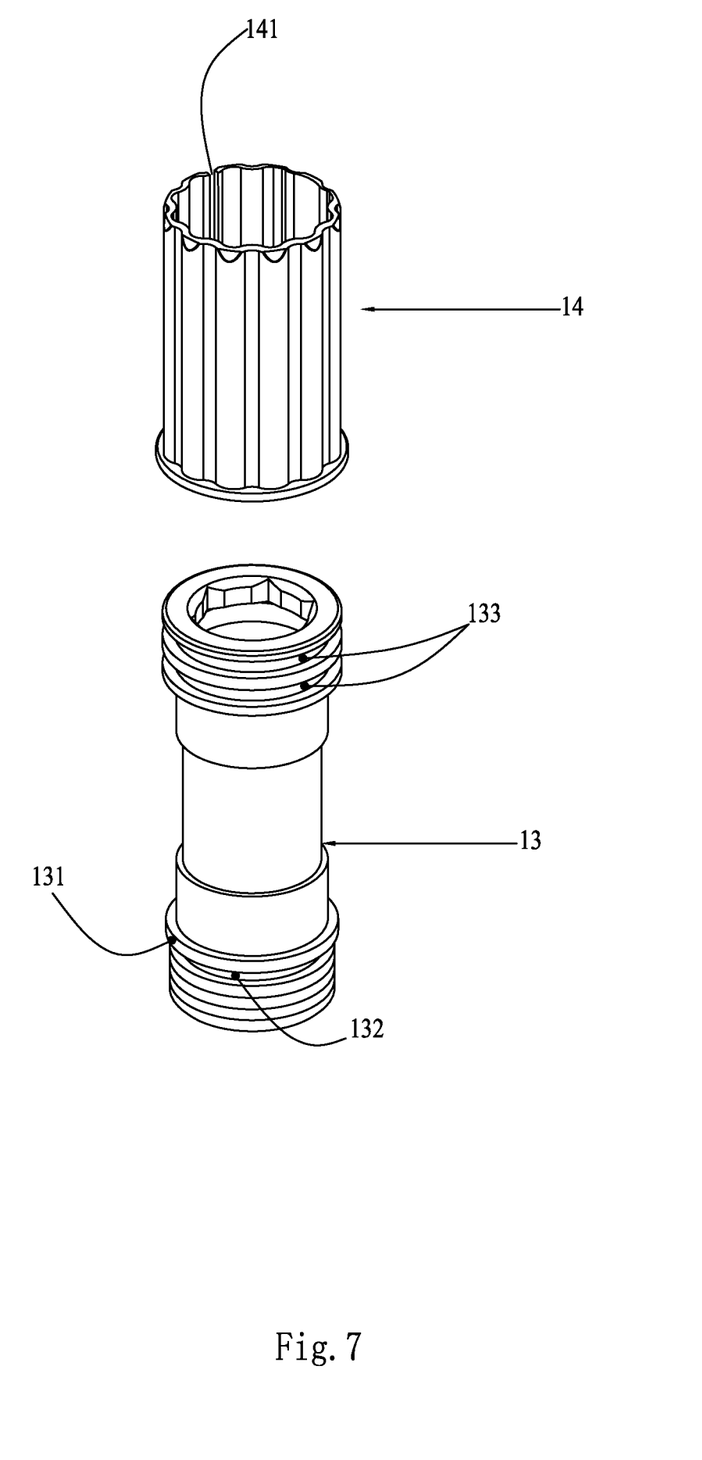
FIG. 7 is a schematic view of a combination of a connector and a C-type ferrule according to an embodiment of the present application.

A guide tube 92, a first water inlet tube 931, a second water inlet tube 932 and a mixed water outlet hose 94 are nested inside the main pipe 11. The guide tube 92 passes through the keeping off space 221 and is threadedly connected and fixed to the threaded mounting hole 113. An inner cavity of the guide tube 92 is in communication with an inner cavity of the connector 13, and the inner cavity of the connector 13 is in communication with an inner cavity of the bent pipe 9. It is to be noted that, the guide tube 92 can be extended by connecting outwardly an extension pipe 95 (as shown in FIG. 4), and the extension pipe 95 has an outer wall provided with a threaded section, and passes through a through hole of a fixing seat 98, and is fixed to the bottom of a mounting table by the fixing seat 98 and a nut 99, to thereby achieving the fixing of the faucet main body 1. The first water inlet tube 931, the second water inlet tube 932, and the mixed water outlet hose 94 pass through a gap between an outer wall of the guide tube 92 and the inner wall of the main pipe 11 and are respectively in communication with the first water inlet channel 32, the second water inlet channel 33 and the water outlet channel 31 correspondingly arranged in the body 220 of the main body fixing seat 22. The other end of the mixed water outlet hose 94 passes through the guide tube 92, the connector 13, the bent pipe 9 sequentially and is in a sealed communication with the water outlet head 91. Apparently, it is required that the mixed water outlet hose 94 has a certain length, to meet the pulling-out requirement on length for the water outlet head 91 of the pull-out faucet, and a counterweight (not shown) is provided to be sleeved on the mixed water outlet hose 94.

In this way, cold water flows through the first water inlet channel 32 of the body 220 of the main body fixing seat 22 via the first water inlet tube 931, and flows from the first water inlet 2102 of the valve core seat 21 into the third water inlet of the valve core 6;

hot water flows through the second water inlet channel 33 of the body 220 of the main body fixing seat 22 via the second water inlet tube 932, and flows from the second water inlet 2103 of the valve core seat 21 into the fourth water inlet of the valve core 6; and the cold water and the hot water converge into the valve core 6 to form a mixed water, and the mixed water flows into the first water outlet of the valve core seat 21 via the second water outlet of the valve core 6 and flows into the mixed water outlet hose 94 via the water outlet channel 31 of the body 220 of the main body fixing seat 22, and is finally sprayed out from the water outlet head 91.

When to use, the handle 8 is utilized to turn on the water paths of the faucet, to realize the outflow of mixed water of the hot and cold water, and further the pull-out water outlet head 91 is taken off from the outer end of the bent pipe 9, and is pulled outwards to a desired length, and thus it can be used. When the use finishes, the pull-out water outlet head 91 is released and subjected to the dragging and pulling of the counterweight, the mixed water outlet hose 94 is drawn backwards, to drive the pull-out water outlet head 91 to return to the outer end of the bent pipe 9, to realize the return.

What is claimed is:

1. A pull-out faucet comprising a pull-out faucet main body, wherein
the pull-out faucet main body comprises a valve core seat assembly;
the faucet main body is composed of a main pipe and a side wall branch pipe, the main pipe is penetrated in an axial direction, and the side wall branch pipe is obliquely arranged from a side wall of the main pipe, and the side wall branch pipe is penetrated in the axial direction;
the valve core seat assembly comprises a valve core seat and a main body fixing seat; the main body fixing seat comprises a body and a lug, and the body is composed of a vertical section and an oblique section, an included angle formed by the vertical section and the oblique section matches an included angle formed by the main pipe and the side wall branch pipe, the body is provided with the lug extending outwards in a horizontal direction, and the lug is provided with a first threaded hole, and a water outlet channel and at least one water inlet channel independent from each other are formed inside the body;
the valve core seat comprises a water passing end surface and an annular flange, and the water passing end surface is fixedly arranged on an end of the oblique section of the body of the main body fixing seat, the water passing end surface is provided with a water outlet and a water inlet in communication with the water outlet channel and the at least one water inlet channel of the body respectively; the annular flange extends outwardly from the water passing end surface at an end facing towards the side wall branch pipe, and forms together with an outer edge of the water passing end surface a first stepped surface, and the annular flange has an outer wall provided with a threaded section;

an inner wall of the main pipe is provided with a second threaded hole, and when the valve core seat assembly is installed in the main pipe, and the first threaded hole of the lug of the main body fixing seat is aligned opposite to the second threaded hole, a bolt is threadedly connected into the first threaded hole and the second threaded hole sequentially to lock and fix the main body fixing seat into the main pipe, a keeping off space is formed between the body of the main body fixing seat and the inner wall of the main pipe, the valve core seat is located in the side wall branch pipe, and a gap is presented between the threaded section of the annular flange of the valve core seat and an inner wall of the side wall branch pipe.

2. The pull-out faucet according to claim 1, wherein the body of the main body fixing seat is provided with a pair of lugs, comprising the lug, with a gradually increasing distance between the pair of lugs in the main pipe, each lug of the pair of lugs is provided with the first threaded hole; the inner wall of the main pipe is provided with second threaded holes comprising the second threaded hole, and the second threaded holes are respectively aligned opposite to the first threaded holes of the main body fixing seat; when the valve core seat assembly is installed in the main pipe, two bolts are respectively threadedly connected into the first threaded holes and the second threaded holes sequentially to lock and fix the main body fixing seat into the main pipe, and the pair of lugs, the inner wall of the main pipe and an outer wall of the vertical section of the body enclose to form the keeping off space.

3. The pull-out faucet according to claim 1, wherein the lug of the main body fixing seat is provided with a positioning through hole beside the first threaded hole of the lug; and the inner wall of the main pipe is provided with a positioning blind hole beside the second threaded hole of the inner wall of the main pipe, and the positioning blind hole is aligned opposite to the positioning through hole; and when the valve core seat assembly is mounted in the main pipe, a positioning pin passes through the positioning through hole into the positioning blind hole sequentially, and the bolt is threadedly connected into the first threaded hole of the lug of the main body fixing seat and the second threaded hole in the main pipe sequentially, a cap nut of the bolt abuts an inner side of the cap nut against an end of the positioning pin such that the positioning pin does not fall off from the positioning through hole.

4. The pull-out faucet according to claim 3, wherein the positioning pin has an interference fit with each of the positioning through hole and the positioning blind hole.

5. The pull-out faucet according to claim 1, wherein the body of the main body fixing seat has a first water inlet channel, a second water inlet channel and the water outlet channel are independent from each other in the body; and the water passing end surface of the valve core seat is provided with the water outlet, a first water inlet and a second water inlet respectively, the water outlet channel is in communication with the water outlet, the first water inlet channel is in communication with the first water inlet, and the second water inlet channel is in communication with the second water inlet.

6. The pull-out faucet according to claim 1, wherein the water passing end surface of the valve core seat is provided with a positioning hole.

7. The pull-out faucet main body according to claim 1, wherein the side wall branch pipe is provided with a second stepped surface at an end facing towards the main pipe, and the second stepped surface is configured to abut against the water passing end surface of the valve core seat.

8. The pull-out faucet according to claim 1, further comprising the at least one water inlet channel being a first water inlet channel and a second water inlet channel formed independent from each other in the body of the main body fixing seat;

the water passing end surface of the valve core seat being provided with a first water outlet, a first water inlet and a second water inlet respectively, wherein the water outlet channel is in communication with the first water outlet, the first water inlet channel is in communication with the first water inlet, and the second water inlet channel is in communication with the second water inlet;

a sleeve, a valve core and a compression ring further provided in the side wall branch pipe;

wherein the sleeve has an inner wall provided with a threaded section threadedly connected to the threaded section of the annular flange of the valve core seat, the valve core is arranged inside the sleeve and is configured to perform an adjustment of a water temperature and a switching on/off of water paths, the valve core is provided with a water outlet end surface at a first end facing towards the valve core seat;

wherein the water outlet end surface is provided with a third water inlet, a fourth water inlet and a second water outlet respectively, the valve core is provided at a second end with an adjusting knob, and the third water inlet, the fourth water inlet and the second water outlet of the water outlet end surface of the valve core are respectively in communication with the first water inlet, the second water inlet and the first water outlet correspondingly arranged in the water passing end surface of the valve core seat, and wherein the compression ring is sleeved on an end, at the adjusting knob; of the valve core, the compression ring has an outer wall provided with a threaded section, and the compression ring and the sleeve are threadedly connected and fixed to each other to ensure the valve core is firmly confined in the sleeve;

a handle rotatably arranged on an outer side of the side wall branch pipe, wherein the handle is fixedly connected to the adjusting knob of the valve core;

a bent pipe provided at an upper end of the main pipe, a pull-out water outlet head provided at an outer end of the bent pipe, a threaded mounting hole provided in an inner cavity of the main pipe above the keeping off space in the main pipe, and a guide tube, a first water inlet tube, a second water inlet tube and a mixed water outlet hose are arranged in the inner cavity of the main pipe, wherein the guide tube passes through the keeping off space and is threadedly connected and fixed to the threaded mounting hole, the guide tube has an inner cavity in communication with an inner cavity of the bent pipe, the first water inlet tube, the second water inlet tube, and the mixed water outlet hose pass through a gap between an outer wall of the guide tube and the inner wall of the main pipe, the first water inlet tube, the second water inlet tube, and the mixed water outlet hose are respectively in communication with the first water inlet channel, the second water inlet channel and the water outlet channel correspondingly arranged in the body of the main body fixing seat, an end of the mixed water outlet hose passes through the guide tube and the bent pipe sequentially, and the end of the mixed water outlet hose is in a sealed communication with the pull-out water outlet head;

wherein cold water flows through the first water inlet channel of the body of the main body fixing seat via the first water inlet tube, and flows from the first water inlet of the valve core seat into the third water inlet of the valve core;

wherein hot water flows through the second water inlet channel of the body of the main body fixing seat via the second water inlet tube, and flows from the second water inlet of the valve core seat into the fourth water inlet of the valve core; and wherein the cold water and the hot water converge into the valve core to form a mixed water, wherein the mixed water flows into the first water outlet of the valve core seat via the second water outlet of the valve core and flows into the mixed water outlet hose via the water outlet channel of the body of the main body fixing seat, such that the mixed water is finally sprayed out from the pull-out water outlet head.

9. The pull-out faucet according to claim 8, wherein the valve core is provided with two positioning protruding bits at a bottom of the valve core, the water passing end surface of the valve core seat is provided with two positioning holes aligned opposite to the two positioning protruding bits, a positioning matching between the two positioning protruding bits and the two positioning holes to ensure the first water outlet, the first water inlet and the second water inlet of the water passing end surface of the valve core seat are respectively in communication with the third water inlet, and wherein the fourth water inlet and the second water outlet are correspondingly arranged in the water outlet end surface of the valve core.

10. The pull-out faucet according to claim 8, wherein the bent pipe is rotatable circumferentially about a central axis of the main pipe, and an inner wall of the upper end of the main pipe is provided with a circle of a stepped edge and internal screw threads sequentially from top to bottom;

the pull-out faucet further comprises a connector and a C-shaped ferrule;

wherein the connector is penetrated axially and is provided at a bottom portion of the connector with external screw threads, a first annular groove and a convex edge sequentially from bottom to top, wherein a first O-ring is nested in the first annular groove, the connector is provided with at least one second annular groove at an upper part of the connector, a second O-ring is nested in the second annular groove, the connector has a necking section arranged between the first annular groove and the second annular groove, the C-shaped ferrule is sleeved on the necking section, and the C-shaped ferrule is rotatable circumferentially relative to the connector; and wherein a bottom of the connector and the upper end of the main pipe are threadedly connected to each other until the convex edge of the connector and the stepped edge of the inner wall of the upper end of the main pipe abut against each other to ensure a firm connection of the connector to the main pipe, the bent pipe is sleeved onto the connector, an inner wall of the bent pipe is in interference fit with the C-shaped ferrule, and wherein the second O-ring and the first O-ring at an upper end and a lower end of the connector abut against and contact the inner wall of the bent pipe for the bent pipe to be circumferentially rotatable with respect to the connector.

\* \* \* \* \*